Dec. 13, 1938.      H. CHASE      2,139,805

TEMPERATURE INDICATOR

Filed Aug. 20, 1936

INVENTOR
HERBERT CHASE
BY
Hammond & Littell
ATTORNEYS

Patented Dec. 13, 1938

2,139,805

UNITED STATES PATENT OFFICE 2,139,805

TEMPERATURE INDICATOR

Herbert Chase, New York, N. Y., assignor to United Specialties Sales Corporation, New York, N. Y., a corporation of Delaware Application August 20, 1936, Serial No. 96,936

2 Claims. (Cl. 73—378)

This invention relates to improved temperature indicating devices of inexpensive and simple construction which are adapted principally for use on automobiles and in homes for convenient indication of atmospheric temperatures.

Thermometer constructions are well known in which the thermometer stem is mounted on a rigid supporting member and held in the place of use by specially constructed brackets, permanent fastening means, or screws. It is also known to mount a thermometer on an elongated rubber body and to hold said body onto a supporting surface by two or more suction cups fixed to the body. The first type of construction enables easy breakage of the tube due to shocks and the like. The second type must be formed with precision to enable permanent fastening of the several suction cups so that tension in the rubber body will not pull them free, and even if properly constructed the body tends to dislodge the cups unless positioned with extreme accuracy. Both types, moreover, are unduly complicated and relatively expensive.

An object of my invention is to provide an improved temperature indicator which includes unitary means for mounting a thermometer and for holding the same on a supporting surface and which is so simple of construction that it may be produced at extremely low cost.

Another object of the invention is to provide an improved construction in which a large portion of the thermometer stem is freely exposed for observation and the portion adjacent the bulb is mounted resiliently without destroying the exposure of the bulb to the surrounding atmosphere.

Figure 1:
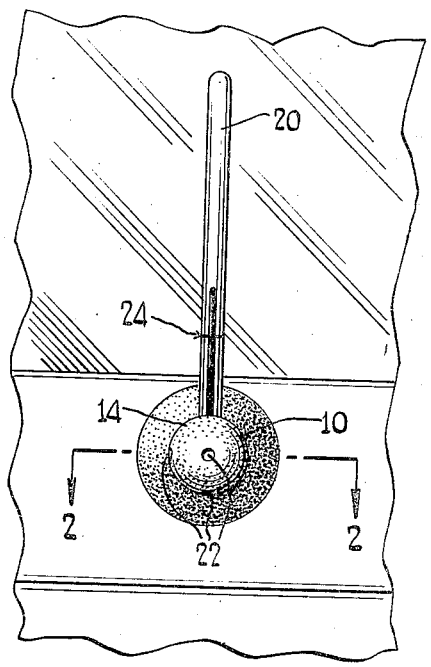
Figure 2:
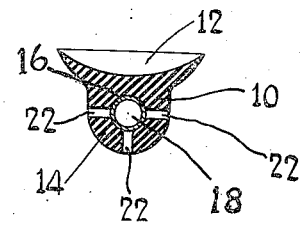
Figure 3:
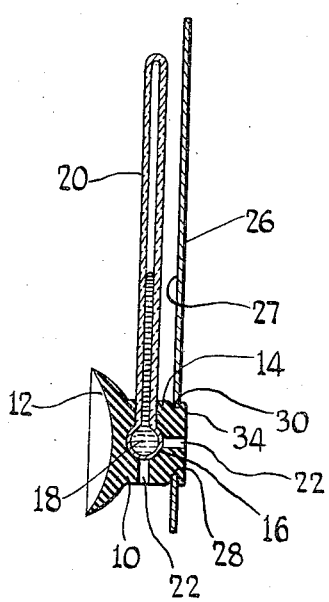
Figure 4:
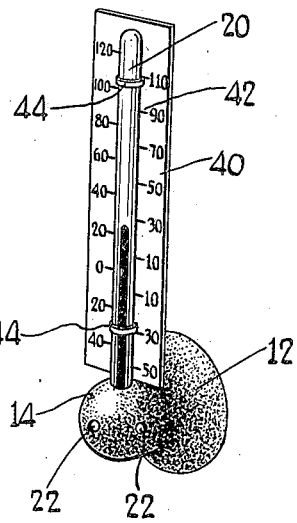

Still another object of the invention relates to the provision of an inexpensive construction in which a thermometer is insulated from its supporting surface and resiliently mounted so that shocks will not cause breakage. Other objects and advantages of the invention will become apparent from the following description taken in connection with the accompanying drawing, forming a part hereof, in which:

Figure 1 shows, in elevation, an embodiment of the invention adapted principally for use on the outside of an automobile and shown so applied, Figure 2 is a sectional view taken substantially on the line 2—2 of Figure 1, Figure 3 is a sectional view of a modification in which a device similar to that of Figure 1 is provided with a card-like member for a temperature scale; and Figure 4 is a perspective view of another modification for use when the temperature is observed by looking toward, instead of through or over, the supporting surface.

Referring to Figs. 1 and 2, mounting member 10, of rubber or similar resilient material, is formed with a suction cup 12 and an extension 14, in which extension a recess or chamber 16 for the bulb 18 of the thermometer 20 is provided. Several ducts 22 lead from the recess 16 to the outside of extension 14 to establish communication between the bulb and the surrounding atmosphere.

The mounting member 10 may be formed simply by a single molding operation, and the thermometer 20 may be combined therewith by flexing the extension 14 to allow insertion of the bulb 18. An alternative method of combining the mounting member and the thermometer is to mold the former around the latter.

The device of Figs. 1 and 2 may be provided with one or more scale markings 24 to designate significant temperature conditions. In Fig. 1, the marking 24 indicates a temperature corresponding to the freezing point of water.

This device is especially useful to indicate weather conditions requiring the addition of an anti-freeze medium to automobile cooling solutions, and it may be positioned on the windshield or window of the automobile for observation through the glass, or on any flat non-transparent surface on the outside of the automobile body, as illustrated in Fig. 1, so that the driver may observe the indicated temperature by looking over the supporting member. Due to its light weight it is permanently held in place by the single suction cup. Since the thermometer is resiliently mounted, shocks occasioned by driving cause neither breakage of the stem nor destruction of the suction connection. Since the bulb of the thermometer is mounted in material having poor heat conductivity, the recorded temperature is not affected by conduction of heat from the automobile body or by direct exposure to the sun. The bulb, nevertheless, is exposed to the surrounding atmosphere, and the thermometer accurately indicates atmospheric temperatures.

In Fig. 3, I illustrate a modification of the embodiment of Fig. 1. Instead of a scale or markings on the thermometer tube 20, a card-like member 26 having scale lines at 27 is positioned on the end of the mounting member 10 opposite the suction cup 12. The member 26 may be of metal, glass, cardboard or any other inexpensive material capable of being formed in thin sheets. It is provided with an opening 28 of a size to be received and held by the annular groove 30 in the extension 14 of mounting member 10, but sufficiently large to enable insertion of the end 34 of said extension when the end is compressed. The card-like member obviously may be secured to the mounting means 10 in other ways, for example, it might be connected to the end thereof by a staple.

As an additional embodiment of the invention I illustrate in Fig. 4 an arrangement for use in the interior of an automobile, room or the like—in fact, for any use wherein the indicating means is positioned between the supporting surface therefor and the observer. In this embodiment the mounting member may be formed as shown and described in connection with Figs. 1 and 2. Between the stem of the thermometer 20 and the suction cup 12 is positioned a card-like member 40 having scale readings 42 thereon to designate the temperatures recorded by the thermometer. In Fig. 4, member 40 is shown attached to the thermometer 20 by clips 44. Obviously, however, it might be secured independently to the mounting member 10 as, for example, by fitting it over member 10 and into a groove therein between the thermometer 20 and cup 12.

An important feature of my invention consists in its extreme simplicity of construction and low cost. In one of its simplest forms the invention includes a single suction cup of resilient material having a backward extension which grips and resiliently holds the thermometer and in which the bulb of the thermometer is mounted in communication with the surrounding atmosphere. This construction requires but two elements, the mounting and gripping member, molded or otherwise formed in a simple manner, and the thermometer which may be inserted into the mounting member after the latter has been formed or during the formation thereof. Due to the simplicity and low cost of the improved device, it may be used to advantage as an advertising medium and distributed at little or no charge.

While I have described several embodiments of my invention, and several ways in which it may be used, it is to be understood that the invention is not limited to any particular embodiment or any particular use thereof, but that it is to be construed broadly within the spirit of the disclosure and the scope of the appended claims.

I claim:

1. A temperature indicating device consisting of a resilient body including a suction cup and an extending portion of less diameter than said cup behind the same, a thermometer having its bulb embedded in said portion, said portion including openings establishing communication between the thermometer bulb and the surrounding atmosphere, a member having a scale gauged for said thermometer, said member being mounted on and supported by said extending portion of said suction cup.

2. A temperature indicating device comprising a rubber suction cup and an integral supporting portion also of rubber extending rearwardly therefrom and having a reduced portion to project through a thermometer scale plate, a thermometer scale plate mounted on said extending portion, said cup and extending portion having a recess between the cup and said scale plate, and a thermometer adjacent said scale plate having the bulb extending into said recess.

HERBERT CHASE.